(12) United States Patent
Oh et al.

(10) Patent No.: US 6,841,004 B2
(45) Date of Patent: Jan. 11, 2005

(54) OPTICAL FIBER COATING DEVICE HAVING COOLER

(75) Inventors: Sung-Koog Oh, Kumi-shi (KR); Man-Seok Seo, Kumi-shi (KR); Kyeong-Sup Kim, Kumi-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/756,340

(22) Filed: Jan. 8, 2001

(65) Prior Publication Data

US 2001/0007243 A1 Jul. 12, 2001

(30) Foreign Application Priority Data

Jan. 6, 2000 (KR) ............................................. 2000-433

(51) Int. Cl.⁷ ............................................. B05C 13/00
(52) U.S. Cl. ............................... 118/69; 118/65; 118/67
(58) Field of Search ......................... 65/434, 430, 432, 65/510, 511–513; 118/420, 405, 66–69

(56) References Cited

U.S. PATENT DOCUMENTS

| | | | |
|---|---|---|---|
| 4,437,870 A | * | 3/1984 | Miller |
| 4,792,347 A | * | 12/1988 | Deneka et al. |
| 5,974,837 A | * | 11/1999 | Abbott, III et al. ......... 118/420 |
| 6,010,741 A | * | 1/2000 | Rosenkranz et al. ........ 118/405 |

FOREIGN PATENT DOCUMENTS

| | | |
|---|---|---|
| DE | 3818266 A1 | 12/1989 |
| EP | 0913368 A2 | 5/1999 |
| EP | 0913368 A3 | 6/1999 |

OTHER PUBLICATIONS

Streeter, Victor L., Fluid Mechanics, Fourth Edition, New York: McGraw–Hill Book Company, pp. 10–11 and 669, 1966.*

Jochem; et al. "High Speed Bubble–Free Coating of Optical Fibres on a Short Drawing Tower", Oct. 1, 1985; pp. 515–518; International Conference on Integrated Optics and Optical Fibre Communication (IOOC) and European Conference on Optical Communication (ECOC), IT, Genova, IIC, vol. Conf. 5, 11.

* cited by examiner

Primary Examiner—Brenda A. Lamb
(74) Attorney, Agent, or Firm—Cha & Reiter, L.L.C.

(57) ABSTRACT

Disclosed is an optical fiber coating device for coating the outer circumference of the optical fiber with the coating material, in which the coating device is provided with and a gas provider for providing an environmental gas within the coating device, and a cooler for cooling down the environmental gas provided to the coater from the gas provider.

4 Claims, 4 Drawing Sheets

FIG. 1  [PRIOR ART]

OPTICAL FIBER COATING DEVICE HAVING COOLER

CLAIM OF PRIORITY

This application claims priority to an application entitled "Optical Fiber Coating Device Having Cooler" filed with the Korean Industrial Property Office on Jan. 6, 2000 and there duly assigned Ser. No. 433-2000.

BACKGROUND OF THE INVENTION

1. Field of the Invention

The present invention relates generally to an optical fiber drawing device, and in particular, to an optical fiber coating device with a cooler component.

2. Description of the Related Art

In general, all fibers share the same fundamental structure. The center of the fiber is the core, which has a higher refractive index than the cladding that surrounds the core. The difference in the refractive index causes total internal reflection that guides light along the core. The size of core and cladding can vary depending on the type of images or light for illumination. A plastic coating increases the diameter of the fibers. The goal of the coating is to provide easier handling and to protect the fiber surfaces from scratches and other mechanical damages.

Most fibers are made of pure glass, such as a sillica-based glass, with small levels of impurities to adjust the refractive index. Various amounts of information including video images and computer data are converted into optical signals, then propagated along the optical fiber. Due to inherent glass characteristics, the optical fiber is vulnerable to external tension, sharp bending forces, and various stresses. In particular, the optical fiber is acutely vulnerable to tension applied in the elevation direction.

Mechanically, glass fibers are stiff but flexible and strong. In order to test the optical properties, a destructive tension test is often performed to measure the tension-resistance of the optical fiber. The destructive tension test is characterized by longitudinally pulling the optical fiber and measuring the extent of the whole fiber length by which it is stretched before inducing mechanical damage along the fiber surfaces. A typical optical fiber is known to be stretched approximately 0.5% more than its original length before mechanical damage. Accordingly, plastic coating may not affect the propagation characteristics of the electric wave along the fiber, but may be regarded as an essential element in protecting the optical fiber surfaces from mechanical damage.

The material of the coating is typically selected from the group consisting of different plastics, i.e., polyester materials, ultraviolet-hardened resins, thermal-hardened resins, etc. Bare glass fibers are coated with plastic through an extrusion technique as they are manufactured to protect from physical damage. Here, the bare glass refers to an uncoated optical fiber, namely, an optical fiber composed of only a core and a clad. Then, the plastic materials that are applied to the optical fiber through the extrusion manner are hardened by a cooler, such as a cooling reservoir filled with cooling water. Alternatively, the bare glass fibers are coated with ultraviolet-hardened resins in liquid form; then, ultraviolet rays are irradiated to the optical fiber for hardening purposes. In another alternative, the bare glass fibers are coated with thermal-hardened resins in liquid form and then hardened by the heat treatment.

An optical drawing device is used to coat the bare glass fibers with the ultraviolet-hardened resin, and the device typically includes a furnace, a coating device, an ultraviolet hardener, a capstan, and a spool. The furnace has a cylindrical shape and applies heat to one end of an optical fiber preform, which consists of a core and clad member, in order to melt the optical fiber preform. Here, the optical fiber preform is similar to the bare glass in terms of their composition, but the diameter is much greater than that of the bare glass. Also, during the heat application process, an inert gas flows into the furnace to prevent any combustion inside the furnace during the heat treatment.

FIG. 1 is a simplified diagram illustrating the construction of a coating device according to a prior art. Basically, this coating device includes a coater 12 with a first and second applicators 13 and 14, and annex devices including a gas provider 19, a gas controller 18, a filter 17, a coating material reservoir (not shown), etc. The gas controller 18 controls the amount of gas supplied to the coater 12 via the filter 19. The coater 12 includes a chamber for mounting the first and second applicators 13 and 14. A passageway is formed inside the coater 12, so that the bare glass 11 can pass through the passage way. The passage way also receives the gas provided from the gas provider 19 to eliminate bubbles formed along the fiber during the coating process. The first and second applicators 13 and 14 are filled with the coating materials provided from the coating material reservoir in order to actuate the coating along the passing bare glass 11. Hence, the bare glass 11 is coated twice while passing through the first and second applicators 13 and 14. Then, the ultraviolet hardener is positioned at the exit of the coating device to harden the optical fiber by irradiating ultraviolet rays into the coating of the optical fiber.

In addition, the first and second applicators 13 and 14 are configured to execute a double coating to reduce physical damages associated with cabling, installation, or environmental changes during the service life of the optical fiber. The coating material provided in the first applicator 13 includes a softer physical property than the materials provided in the second applicator 14. However, as the optical fiber is passed through the coating materials, bubbles may be entrapped along the fiber. If the kinematic viscosity of gas provided from the gas provider 19 is large, the gas is entered into the coating material easily and gets adhered to the optical fiber. A part of this entered gas is dissolved but other part remains in the form of bubbles. Thus, the entrapment of bubbles is determined by the kinematic viscosity of gas inside the chamber as well as the surface characteristics of the optical fiber. Also, the pressure fluctuation inside the coating chamber during the coating process affects the amount of gas entrapped along the surface of the optical fiber.

A capstan-type device is used to draw the optical fiber with a predetermined power, so as to consecutively draw the optical fiber from the optical fiber preform at specific intervals. The spool having a cylindrical reel shape causes the drawn optical fiber wind around outer circumference thereof. The entrapment of bubbles, as described in the preceding paragraphs, becomes problem when the drawing speed is increased. Yet, in order to increase the productivity, optical fibers are frequently pulled at a faster rate, which in turn lower the required kinematic viscosity of the environmental gas provided in the coating device. That is, if the drawing velocity is increased, the amount of bubbles produced within the coater 12 and the probability of gas trapped in the coating material is increased since the contact angle of a core-cladding layer to the coating material becomes smaller. Accordingly, it requires extra time for the entrapped gas to be dissolved in the coating material. Moreover, the coating material is exposed to the UV-ray before the entrapped gas is completely dissolved, thereby being hardened and remained in the form of bubbles.

FIG. 2 is a diagram illustrating bubbles remaining behind during the coating process of an optical fiber at a higher drawing speed. The bubbles 25 generated, as explained in the preceding paragraphs, remain in the first coated coating 23 surrounding the outer circumference of the bare glass 22 of an optical fiber 21. Referring to FIG. 2, the outward appearance of a second coated coating 24 is preserved, but with heavy remnants the outer circumference of the optical fiber 21 would be bulged. Or, if the bubbles formed in the coater 12 through the device shown in FIG. 1 burst when passing the ultraviolet hardener positioned at the bottom of the coater 12, the outer circumference of the optical fiber 21 would be dented.

Such defective optical fiber can not be used and requires the defective areas to be eliminated later. A metallic electric wire can be easily replaced but such operation is impractical as the fiber is very susceptible to any external impact, shearing force, scratching, tension, etc.

To prevent the above problems, the environmental gas with a quite lower kinematic viscosity has been proposed to be utilized when the optical fiber drawing velocity becomes faster. Some of the environmental gas having a low kinematic viscosity includes, for example, $CCl_2F_2$, Xe, etc. However, the proposed gases have other drawbacks as they tend to be expensive, require a delicate storage means, and are harmful to handle.

SUMMARY OF THE INVENTION

It is, therefore, an object of the present invention to provide an optical fiber coating device, which reduces kinematic viscosity of an environmental gas provided to a coater in order to prevent the bubble formation during a high fabrication process.

Accordingly, there is provided an optical fiber coating device having a coater for coating the optical fiber and a gas provider for providing an environmental gas within the coater, wherein the optical fiber further includes a cooler for cooling down the environmental gas provided to the coater from the gas provider.

According to one aspect of the invention, a method for providing a coated fiber is characterized by passing a bare optical fiber through a first coating material and thereafter passing the first coated fiber through a second coating material, wherein said first coating and said second coating are performed under pressure.

BRIEF DESCRIPTION OF THE DRAWINGS

The above and other objects, features, and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 1:
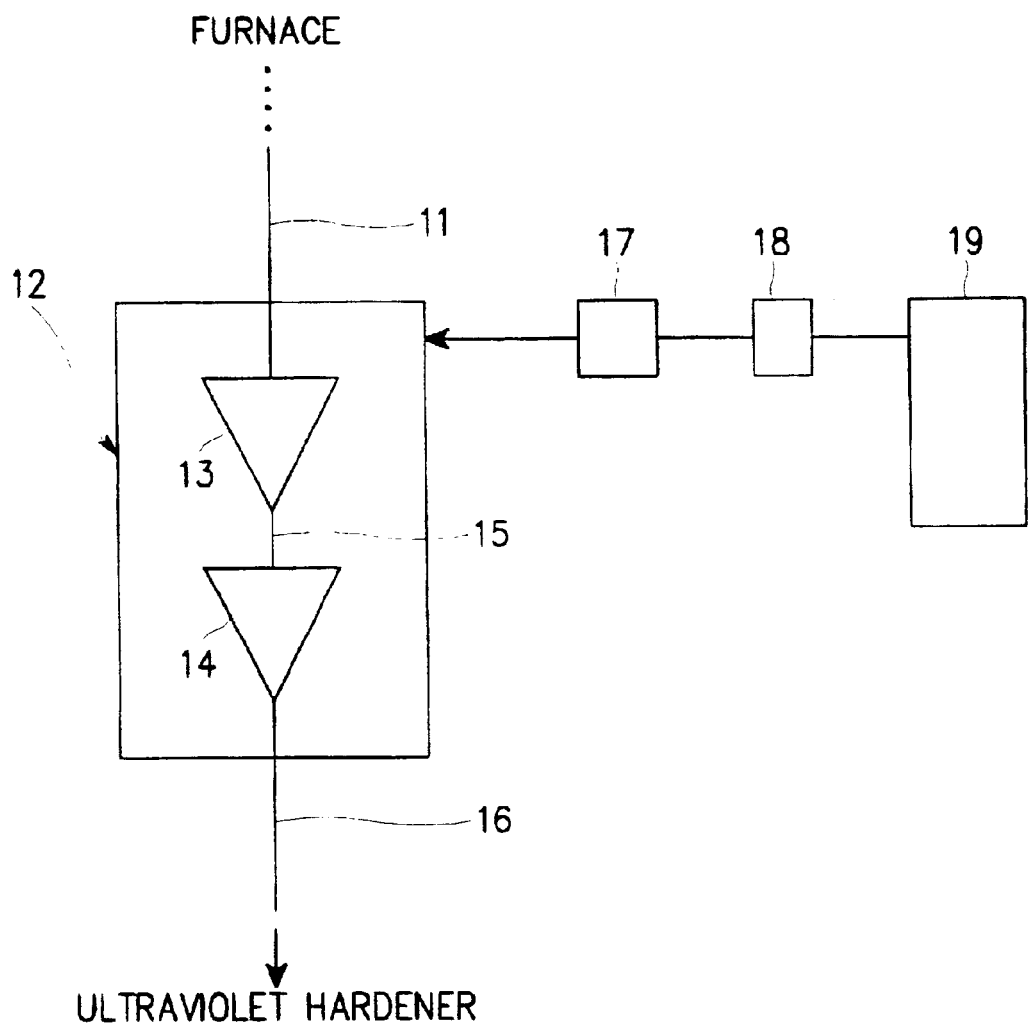
FIG. 1 is a diagram illustrating the construction of a coating device according to the related art.
Figure 2:
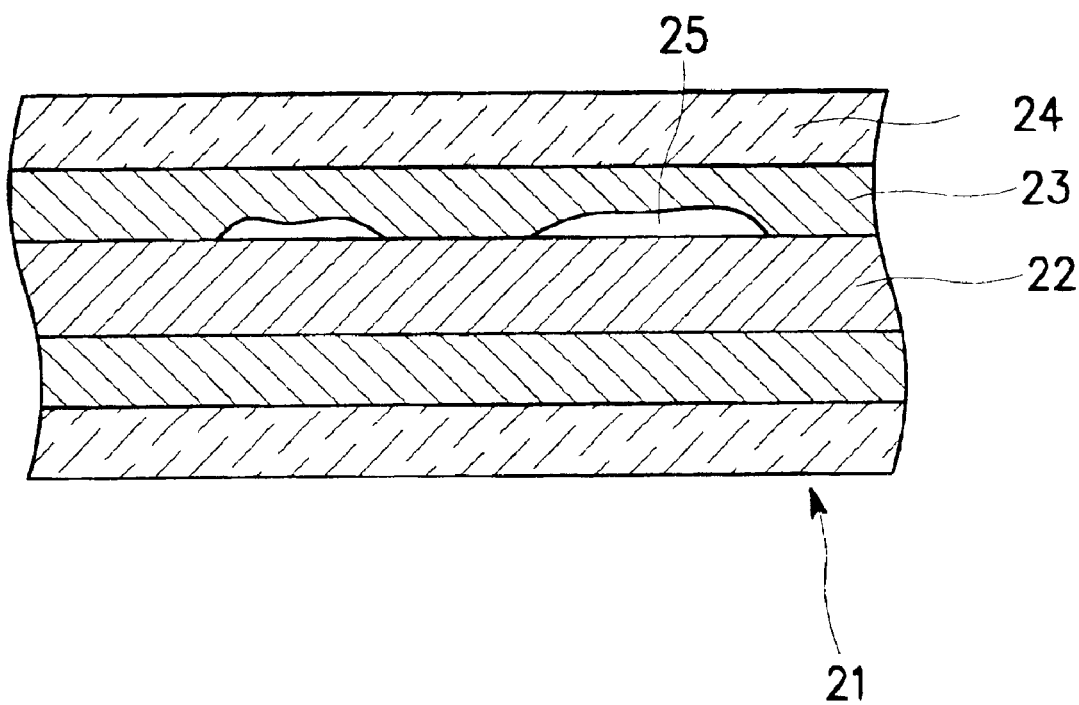
FIG. 2 is a diagram illustrating bubbles remaining behind within a coating of an optical fiber.
Figure 3:
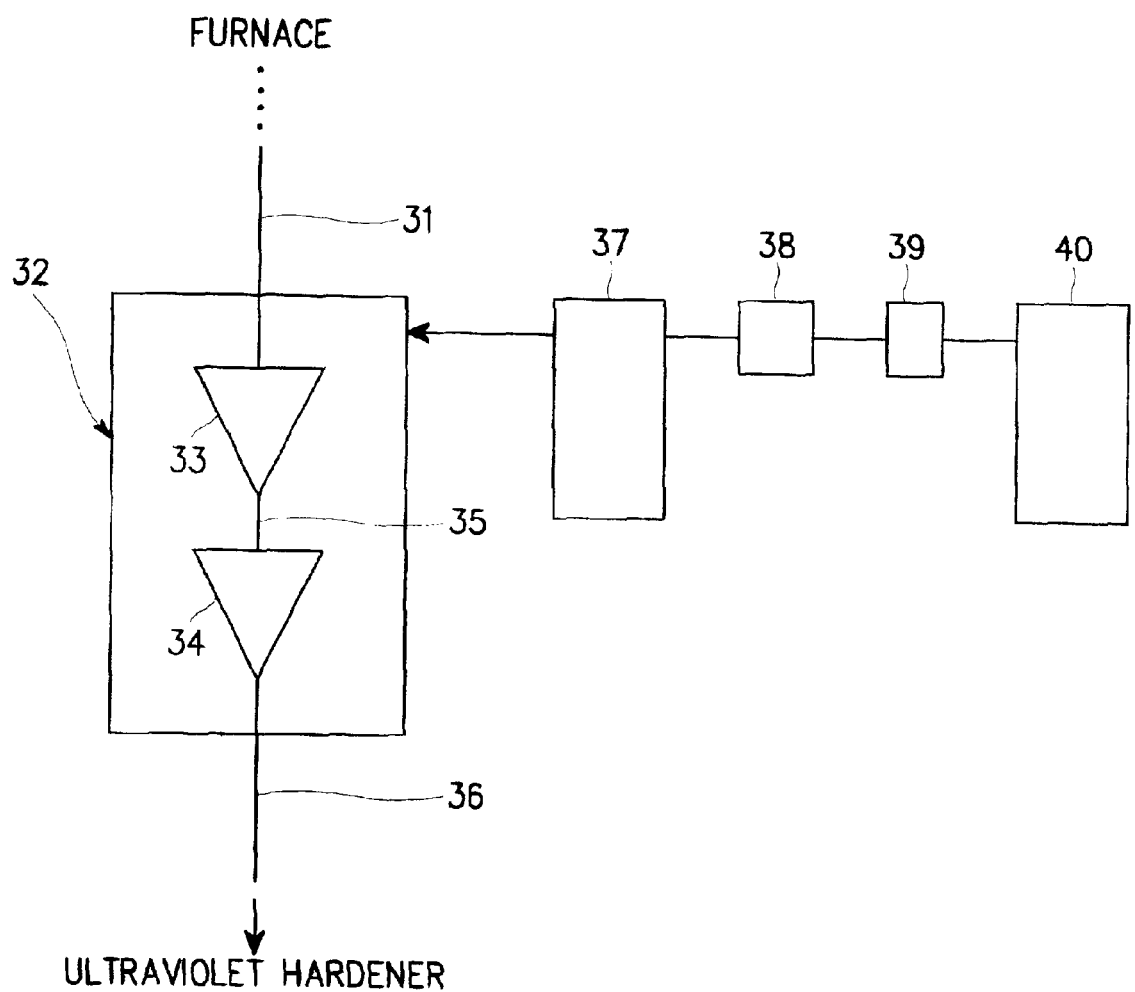
FIG. 3 is a diagram illustrating an optical fiber coating device having a cooler according to a preferred embodiment of the present invention; and, FIG. 4 is a graph illustrating the kinematic viscosity of various environmental gases according to thermal variance.

FIG. 3 is a diagram illustrating an optical fiber coating device according to the preferred embodiment of the present invention. The optical fiber coating device, as shown in FIG. 3, is equipped with a cooler 37 between the coater 32 and the filter 38. A gas provider 40 provides an environmental gas, such as carbon dioxide ($CO_2$), nitrogen, air, argon, that is comparatively inexpensive, less harmful, and easier to handle. The nitrogen tank liquefies and reclassifies air for use in general. To be specific, after pressurizing and then inflating air into a fluid, the nitrogen tank classifies the fluid depending on the different boiling points of oxygen and nitrogen. The liquid nitrogen is first evaporated, the evaporated nitrogen is then pressurized to form a liquid nitrogen, which is turn stored in the nitrogen tank. Since the pressurized nitrogen stored within the nitrogen tank is stored under high pressure, the pressurized nitrogen used as the gas provider according to the present invention should be decompressed at an appropriate pressure. To this end, the gas controller 39 is provided to act as a decompresser for the gas provider 40. The gas passed through the gas controller 39 is injected into a filter 38, which removes any minute particles or impurities contained in the gas, so as to provide a purified gas to the cooler 37. The cooler 37 reduces the temperature of the gas provided therein to a pre-set degree in order to provide gas exhibiting low-temperature to the coater 32. Preferably, the cooler 37 employs a cooling device by the means of circulating air and a water cooling mechanism by the means of circulating water.

Figure 4:
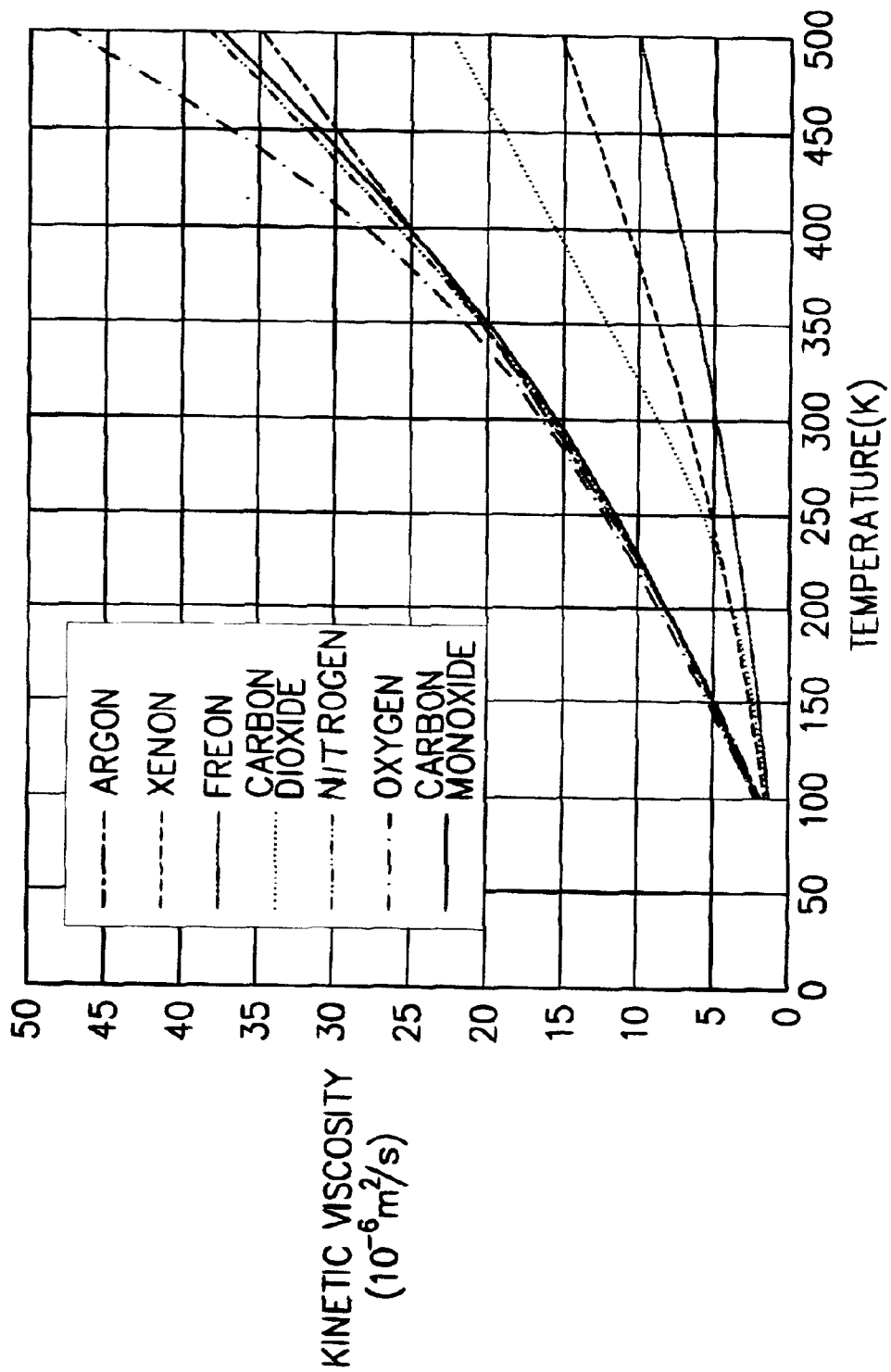

FIG. 4 is a graph illustrating the kinematic viscosity of various gases according to changes in the temperature. As shown in FIG. 4, at room temperature the kinematic viscosity of $CCl_2F_2$ or Xe is higher than the carbon dioxide or nitrogen. However, as the temperature decreases, difference of the kinematic viscosity values between $CCl_2F_2$ or Xe and carbon dioxide or nitrogen is found to be minimal. Accordingly, the present invention employs this temperature reaction characteristics of the gas to control the kinematic viscosity, which in turn reduces bubbles formed during the fabrication stage. The present invention employs carbon dioxide or nitrogen as environment gas, which is relatively inexpensive and less harmful to handle, while obtaining a similar effect as when using $CCl_2F_2$ or Xe. Especially, carbon dioxide has almost a similar kinematic viscosity to $CCl_2F_2$, or Xe at below 250K.

As stated above, the optical fiber coating device having a cooler according to the present invention has the advantage of enabling the provision of an environmental gas economically, and easier for treatment as well as having relatively low kinematic viscosity, by cooling down the environmental gas, thereby reducing the kinematic viscosity of the gas. As the environmental gas has a lower kinematic viscosity, the environmental gas is better absorbed into the coating material solution, thus preventing the entrapment of bubbles when the coating speed is increased.

While the invention has been shown and described with reference to a certain preferred embodiment thereof, it will be understood by those skilled in the art that various changes in form and details may be made therein without departing from the spirit and the scope of the invention as defined by the appended claims.

What is claimed is:

1. An apparatus for coating a bare optical fiber having a core and a cladding, comprising:
   - means for coating said optical fiber;
   - means for pressurizing gas to liquid form;
   - means for decompressing the liquefied gas;
   - means for transmitting the decompressed gas to within said coating means; and
   - means, disposed within said transmitting means, for reducing kinematic viscosity of the gas transmitted.

2. The apparatus of claim 1, wherein the decompressing means comprises a gas controller for controlling the amount of gas decompressed, and wherein the transmitting means further includes a filter coupled to said gas controller for removing impurities contained in the decompressed gas.

3. The apparatus of claim 1, wherein said reducing means operates to reduce the temperature of the gas received therein to the range of 100 to 300 K degrees.

4. The apparatus of claim 1, wherein the coating means comprises at least one container having a coating material therein for coating said bare optical fiber as said fiber passes through said container.

* * * * *